(12) United States Patent
Tanino et al.

(10) Patent No.: US 9,059,567 B2
(45) Date of Patent: Jun. 16, 2015

(54) $CO_2$ LASER DEVICE AND $CO_2$ LASER PROCESSING DEVICE (71) Applicant: Azusa Tanino, Takatsuki-shi (JP)

(72) Inventors: Yoichi Tanino, Takatsuki (JP); Junichi Nishimae, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/362,720

(22) PCT Filed: Oct. 23, 2012

(86) PCT No.: PCT/JP2012/077343
§ 371 (c)(1),
(2) Date: Jun. 4, 2014

(87) PCT Pub. No.: WO2013/084608
PCT Pub. Date: Jun. 13, 2013

(65) Prior Publication Data
US 2014/0334514 A1 Nov. 13, 2014

(30) Foreign Application Priority Data
Dec. 7, 2011 (JP) .................................. 2011-268264

(51) Int. Cl.
*H01S 3/223* (2006.01)
*H01S 3/07* (2006.01)
(Continued)

(52) U.S. Cl.
CPC ............... *H01S 3/2232* (2013.01); *H01S 3/076* (2013.01); *H01S 3/2325* (2013.01); *B23K 26/06* (2013.01);
(Continued)

(58) Field of Classification Search
CPC ........... H01S 3/03; H01S 3/036; H01S 3/041; H01S 3/134; H01S 3/2232; H01S 3/076; H01S 3/2325
USPC .......................................................... 372/55
See application file for complete search history.

(56) References Cited

U.S. PATENT DOCUMENTS 4,481,634 A * 11/1984 Grossman et al. .............. 372/87
5,018,848 A    5/1991 Kamiya et al.
(Continued)

FOREIGN PATENT DOCUMENTS

JP    63-229875 A    9/1988
JP    64-63963       3/1989
(Continued)

OTHER PUBLICATIONS

International Search Report issued Dec. 4, 2012, in PCT/JP2012/077343, filed Oct. 23, 2012.
(Continued)

*Primary Examiner* — Xinning Niu
(74) *Attorney, Agent, or Firm* — Oblon, McClelland, Maier & Neustadt, L.L.P.

(57) ABSTRACT

A $CO_2$ laser device and a $CO_2$ laser processing device for emitting a pulse laser having a high output and a stable beam diameter without depending on a repetition frequency. The $CO_2$ laser device includes: laser gas being a $CO_2$ laser medium; a near-concentric stable optical resonator in which a radius of curvature of at least one resonator mirror is set so as to be equal to a distance from an optical switch to the resonator mirror; an optical switch provided in the stable optical resonator; and transmission mirrors provided so that laser light generated from the stable optical resonator passes through the $CO_2$ laser medium again.

8 Claims, 7 Drawing Sheets

(51) Int. Cl.
- *H01S 3/23* (2006.01)
- *B23K 26/06* (2014.01)
- *G02F 1/11* (2006.01)
- *H01S 3/08* (2006.01)
- *H01S 3/117* (2006.01)
- *H01S 3/081* (2006.01)
- *H01S 3/0971* (2006.01)
- *H01S 3/036* (2006.01)

(52) U.S. Cl.
CPC ............... *G02F 1/11* (2013.01); *H01S 3/2366* (2013.01); *H01S 3/08* (2013.01); *H01S 3/117* (2013.01); *H01S 3/08054* (2013.01); *H01S 3/0816* (2013.01); *H01S 3/0971* (2013.01); *H01S 3/036* (2013.01)

(56) References Cited

U.S. PATENT DOCUMENTS

| | | | |
|---|---|---|---|
| 5,638,397 A | | 6/1997 | Nighan, Jr. et al. |
| 6,504,652 B1 * | | 1/2003 | Ichihashi et al. ............... 359/649 |
| 2005/0220164 A1 * | | 10/2005 | Mori et al. ....................... 372/92 |
| 2008/0225922 A1 | | 9/2008 | Fujikawa et al. |
| 2009/0316746 A1 * | | 12/2009 | Nowak et al. ................... 372/55 |
| 2010/0327192 A1 * | | 12/2010 | Fomenkov et al. ........ 250/504 R |

FOREIGN PATENT DOCUMENTS

| | | |
|---|---|---|
| JP | 9-246632 A | 9/1997 |
| JP | 11-511296 | 9/1999 |
| JP | 2000-91686 | 3/2000 |
| JP | 2010-21518 | 1/2010 |
| JP | 2010-534923 | 11/2010 |
| JP | 2011-155193 | 8/2011 |
| WO | 2007/032066 A1 | 3/2007 |

OTHER PUBLICATIONS

Preliminary Notice of Reasons for Rejection issued Mar. 11, 2014, in Japanese Patent Application No. 2013-548143 (with English-language translation).

Jürg Steffen, et al., "Fundamental Mode Radiation With Solid-State Lasers", IEEE Journal of Quantum Electronics, vol. Qe-8, No. 2, Feb. 1972, pp. 239-245.

Jijang Xie, et al., "Theoretical calculation and experimental study of acousto-optically Q-switched $CO_2$ laser" Optics Express, vol. 18, No. 12, Jun. 7, 2010, pp. 12371-12380.

Japanese Office Action issued Jul. 8, 2014 in Patent Application No. 2013-548143 (with English Translation).

* cited by examiner

CO₂ LASER DEVICE AND CO₂ LASER PROCESSING DEVICE

TECHNICAL FIELD

The present invention relates to a $CO_2$ laser device and a $CO_2$ laser processing device for generating $CO_2$ laser light (hereinafter sometimes referred to simply as "laser light") from a laser oscillator (optical resonator containing a gain medium).

BACKGROUND ART

In the related art, a $CO_2$ laser for generating laser light from an optical resonator containing a gain medium has been proposed (see, for example, Patent Literature 1).

A $CO_2$ laser device described in Patent Literature 1 includes a housing containing a gaseous gain medium including $CO_2$, a laser resonator including a high reflector and an output coupler, an excitation arrangement for exciting the gain medium, and an acousto-optic (AO) cell disposed in the laser resonator. The $CO_2$ laser device generates a Q-switched pulse by switching the laser resonator between a high loss state and a low loss state through use of the AO cell. However, the laser output is limited to a light-resisting power (for example, several hundred watts) or less of the acousto-optic cell.

CITATION LIST

Patent Literature

[PTL 1] JP 2010-534923 A

SUMMARY OF INVENTION

Technical Problem

As described in Patent Literature 1, in the related-art $CO_2$ laser device, the laser output is limited to a light-resisting power (for example, several hundred watts) of the acousto-optic cell, and hence there is a problem in that it is difficult to obtain a high-output laser.

Further, when the repetition frequency of a pulse laser changes, the thermal state of the acousto-optic cell changes. Therefore, there is a problem in that a beam diameter varies depending on the repetition frequency.

The present invention has been made so as to solve the above-mentioned problems, and it is an object of the present invention to provide a $CO_2$ laser device and a $CO_2$ laser processing device capable of obtaining a high-output laser and generating a pulse with a stable beam diameter without depending on a repetition frequency.

Solution to Problem

According to one embodiment of the present invention, there is provided a $CO_2$ laser device, including: a $CO_2$ laser medium; an optical resonator, in which the $CO_2$ laser medium is interposed; an optical switch provided in the optical resonator; and a transmission mirror for reflecting laser light output from the optical resonator to outside of the optical resonator, in which the optical resonator is a near-concentric stable optical resonator, in which a radius of curvature of at least one resonator mirror forming the optical resonator is set so as to be equal to a distance from the optical switch to the at least one resonator mirror, and in which the transmission mirror is disposed so that the laser light passes through the $CO_2$ laser medium again.

Advantageous Effects of Invention

According to one embodiment of the present invention, in the near-concentric stable optical resonator in which the radius of curvature of the at least one resonator mirror is set to be equal to the distance from the optical switch to the at least one resonator mirror, $CO_2$ laser light generated from the optical resonator passes through the $CO_2$ laser medium again, and hence a pulse with a stable beam diameter can be generated with a high output without depending on the repetition frequency.

DESCRIPTION OF EMBODIMENTS

Embodiment 1

Figure 1:
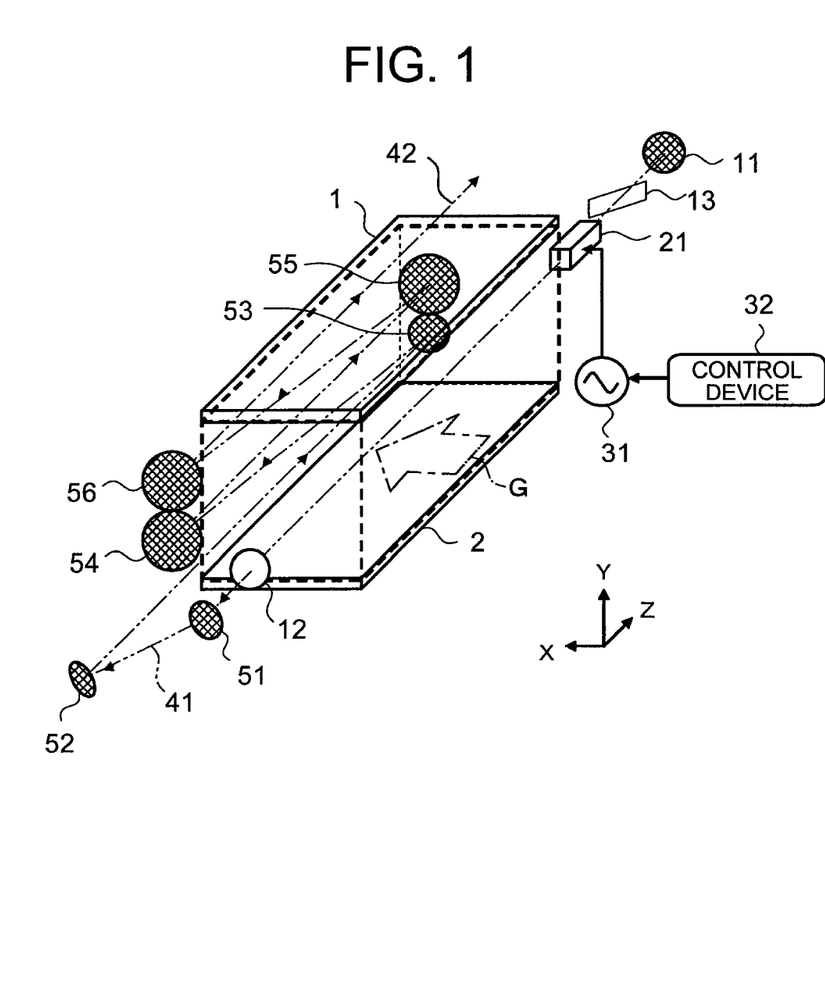
FIG. 1 is a perspective view illustrating, in a transparent manner, a configuration of a $CO_2$ laser device according to Embodiment 1 of the present invention.

FIG. 1 is a perspective view illustrating, in a transparent manner, a configuration of a $CO_2$ laser device according to Embodiment 1 of the present invention.

In FIG. 1, the $CO_2$ laser device includes electrodes 1 and 2 provided in upper and lower portions, laser gas G (gas flow direction on the electrode 2 side is indicated by an arrow of an alternate long and short dash line) filled in a discharge space between the electrodes 1 and 2, a totally reflecting mirror 11 serving as a resonator mirror, a partially reflecting mirror 12 serving as a resonator mirror disposed so as to oppose the totally reflecting mirror 11 through intermediation of the laser gas G, a Brewster plate 13 for providing linear polarization to laser light, an acousto-optic element 21 serving as a modulation element (optical switch) for optical modulation, a power source 31 for applying an AC voltage to the acousto-optic element 21, and a control device 32 for controlling the power source 31.

The totally reflecting mirror 11 and the partially reflecting mirror 12 are arranged so as to oppose each other through intermediation of the laser gas G (discharge excitation gas)

and form a laser oscillator together with the Brewster plate 13, the acousto-optic element 21, and the laser gas G interposed between the totally reflecting mirror 11 and the partially reflecting mirror 12.

Laser light 41 is output from an end surface of the partially reflecting mirror 12. Note that, mixed gas containing $CO_2$ molecules is used as the laser gas G.

Further, the $CO_2$ laser device of FIG. 1 includes transmission mirrors 51 to 56 arranged so as to oppose each other successively from an output surface side of the partially reflecting mirror 12 and a housing (see a frame indicated by a broken line) for confining the laser gas G.

Optical paths of the transmission mirrors 52 to 56 opposed to each other are respectively configured so as to pass through the laser gas G, and laser light 42 is output from the transmission mirror 56 in a final stage.

Herein, for ease of understanding, description is made under the following condition: as in XYZ axes (arrows) in FIG. 1, an optical axis direction connecting the totally reflecting mirror 11 to the partially reflecting mirror 12 is defined as a Z-direction, the gas flow direction of the laser gas G on the electrode 2 side is defined as an X-direction, and a direction (opposed direction of the electrodes 1 and 2) perpendicular to the X-direction and the Z-direction is defined as a Y-direction.

Note that, a heat exchanger, a blower, and the like are provided in the housing to which the laser gas G is supplied, although they are not shown for simplicity.

The blower causes forced convection by circulating the laser gas G filled in the space of the housing. The laser gas G thus cooled is supplied in the left direction of FIG. 1 along the X-direction (direction indicated by the arrow of the alternate long and short dash line) on the electrode 2 side.

Further, the laser gas G is maintained at a pressure lower than the atmosphere in the housing and moves at a speed of, for example, about 100 m/s between the electrodes 1 and 2.

When molecules or atoms in the laser gas G are excited to a laser upper level by discharge, the molecules or atoms exhibit a function of amplifying light.

Therefore, the laser light 41 having a wavelength of 10.6 µm caused by laser oscillation is obtained by the transition of $CO_2$ molecules in the laser gas G (mixed gas containing $CO_2$ molecules) between vibrational levels.

Further, in the housing, the electrodes 1 and 2 excite the laser gas G by discharge.

That is, when a high-frequency AC voltage is applied from a high-frequency power source (not shown) to the electrodes 1 and 2, a discharge space in a cuboid form (for example, about 3 cm×3 cm×100 cm) corresponding to the housing (frame indicated by the broken line) is formed between the electrodes 1 and 2.

The laser gas G is substantially continuously excited by the application of the high-frequency AC voltage, and the laser gas G in the discharge space becomes discharge excitation gas exhibiting the function of amplifying light, together with the laser gas G present in a downstream direction (left direction of FIG. 1) of a laser gas flow with respect to the discharge space.

In the laser oscillator, the totally reflecting mirror 11 and the partially reflecting mirror 12 forming a laser resonator are mounted to the housing through intermediation of an angle fine-adjusting mechanism for optical axis adjustment.

Further, the Brewster plate 13 serving as a polarization selecting element is provided on an optical axis in the laser oscillator.

The Brewster plate 13 is a window having a high reflectance with respect to S-polarized light (polarized light component whose vibration direction of an electric field is perpendicular to an incident surface) and having a low reflectance (for example, less than 1%) with respect to P-polarized light (polarized light component whose vibration direction of an electric field is parallel to an incident surface).

Herein, due to the presence of the Brewster plate 13, laser light having linear polarization in the X-direction is selectively oscillated.

Further, the acousto-optic element 21 serving as a modulation element is provided on the optical axis in the laser oscillator. The power source 31 for generating a compression wave having a frequency of, for example, 40 MHz is connected to the acousto-optic element 21. The control device 32 is connected to the power source 31.

The control device 32 can freely control the presence/absence state of the compression wave generated by the power source 31 and the magnitude of energy of the compression wave.

As the control device 32, a function generator or the like can be used.

Accordingly, the acousto-optic element 21 connected to the power source 31 and the control device 32 serves to control the proceeding direction of a laser beam at a high speed by using a change in refractive index by a compression wave in a transparent material as a diffraction grating.

Note that, as a material for the acousto-optic element 21 in the $CO_2$ laser device, germanium subjected to non-reflecting coating is used.

The totally reflecting mirror 11 and the partially reflecting mirror 12 are aligned so that the output of the laser light 41 from the laser oscillator becomes substantially maximum in the state of absence of a compression wave in the acousto-optic element 21.

First, when an AC voltage is applied from the power source 31 to the acousto-optic element 21, a compression wave is generated in the acousto-optic element 21 to diffract a laser beam. Therefore, the loss per reciprocation of the optical resonator including the totally reflecting mirror 11 and the partially reflecting mirror 12 becomes large.

Thus, the optical resonator is put in a low-Q state, and hence laser oscillation does not occur, with the result that a gain is accumulated in the laser gas G ($CO_2$ laser medium).

Next, when the application of a voltage to the acousto-optic element 21 is stopped or the application of a voltage is sufficiently reduced while a gain is accumulated in the $CO_2$ laser medium, a loss becomes smaller than a gain with respect to the linearly polarized light in the X-direction.

Thus, the optical resonator is put in a high-Q state, and hence an accumulated gain is extracted as pulse light.

That is, when an AC voltage is intermittently supplied to the acousto-optic element 21, the laser light 41 in a pulse form is output from an end surface of the partially reflecting mirror 12.

This phenomenon is called Q-switched pulse oscillation (or simply "Q-switched oscillation"), and a laser performing such an oscillation is called a Q-switched pulse laser (or simply "Q-switched laser").

The transmission mirrors 51 to 56 arranged on an output side of the laser light 42 are formed of a material exhibiting a high reflectance with respect to a laser beam and are subjected to surface treatment for realizing a higher reflectance.

Further, the transmission mirrors 51 to 56 are mounted through intermediation of an angle fine-adjusting mechanism (not shown) for adjusting an optical axis and serve to change the course of the laser light 41.

The laser light 42 (pulse laser) output from the partially reflecting mirror 12 is reflected from the transmission mirrors 51 and 52 and guided again into the discharge excitation gas (laser gas G) in the housing.

The laser light 41 reflected from the transmission mirrors 51 and 52 and introduced again into the discharge excitation gas passes through the discharge excitation gas while being reflected successively from the transmission mirrors 53, 54, 55, and 56 as indicated by an arrow of an alternate long and two short dashes line and is amplified every time passing through the discharge excitation gas.

Specifically, the laser light 41 ($CO_2$ laser beam) extracted from the optical resonator (laser oscillator) between the totally reflecting mirror 11 and the partially reflecting mirror 12 passes through: the transmission mirrors 51 and 52; the discharge excitation gas; the transmission mirror 53; the discharge excitation gas; the transmission mirror 54; the discharge excitation gas; the transmission mirror 55; the discharge excitation gas; the transmission mirror 56; and the discharge excitation gas in the state order, and finally is output as the laser light 42 from the $CO_2$ laser device.

Herein, in the laser light 41 extracted from the partially reflecting mirror 12 in the case of an intermittent operation at a repetition frequency of 100 kHz with an AC voltage to be applied to the acousto-optic element 21 being set to, for example, ON time of 7 μs and OFF time of 3 μs, an average power is about 10 W at a repetition frequency of 100 kHz.

Further, in the laser light 42 to be output finally after the laser light 41 is amplified, an average power is about 1 kW at a repetition frequency of 100 kHz.

The finally output laser light 42 is used for laser cutting, laser drilling, or surface modification by laser irradiation, as described later.

There is an increasing demand for an increase in productivity and enhancement of stability and reliability of $CO_2$ laser processing.

For example, the case is considered where it is desired that a hole to be processed at a high repetition frequency and a hole to be processed at a low repetition frequency have a uniform shape in drilling processing.

In this case, there is a demand for a pulse laser capable of generating pulses having a substantially equal beam diameter between a pulse having a high repetition frequency (for example, 100 kHz) and a pulse having a low repetition frequency (for example, 1 kHz).

Further, the laser light 42 having a high average power (for example, 1 kW) at a high repetition frequency is desired from the viewpoint of increasing processing productivity.

In the case of considering the aforementioned demand, there is problem of a thermal lens effect (degradation of beam quality with the passage of time due to the characteristics of an oscillation principle) of a modulation element such as the acousto-optic element 21.

The thermal lens effect refers to the following phenomenon: in the case where a substance has a temperature distribution symmetric with respect to an optical axis, the substance has a refractive index distribution symmetric with respect to an optical axis; hence light passing through the substance undergoes a convergence and diffusion function similar to that of a lens.

In the $CO_2$ laser device, the $CO_2$ laser absorptivity of the modulation element (acousto-optic element 21) is generally high.

That is, a YAG laser absorptivity of an acousto-optic element of a YAG laser is, for example, less than 0.1%, whereas the $CO_2$ laser absorptivity of the acousto-optic element 21 of the $CO_2$ laser is, for example, about 3% to 10%.

Further, in general, when laser light passes through a substance, as the absorptivity of the substance is higher, heat energy to be generated becomes larger. Therefore, the thermal lens effect also becomes greater.

Note that, an electrooptical element (not shown) of the $CO_2$ laser exhibits a relatively low absorptivity, but still has an absorptivity of about 1% which is higher than the YAG laser absorptivity of the acousto-optic element of the YAG laser. Further, the electrooptical element is hard to find due to the use of CdTe as a raw material, and hence is not available easily and is also expensive.

The Q-switched $CO_2$ laser having the above-mentioned related-art configuration (Patent Literature 1) was not capable of providing a pulse $CO_2$ laser of an average output of 1 kW. This is because a modulation optical element (acousto-optic element) having a $CO_2$ laser resistant output of several hundred watts is incorporated in an optical resonator.

Further, the laser output in the optical resonator is larger (typically, several times) than that extracted from the optical resonator, and hence the upper limit of the laser output from the Q-switched $CO_2$ laser having the related-art configuration was about 100 W.

Further, in the case where the modulation optical element is operated with the repetition frequency of a $CO_2$ laser being changed in a wide range (for example, in a range of 1 kHz to 100 kHz), assuming that the $CO_2$ laser resistant output of the modulation optical element has been improved, an average output correspondingly varies in a range of 10 W to 1 kW. Therefore, it was difficult to stabilize a beam diameter without depending on the repetition frequency due to the influence of the above-mentioned thermal lens effect.

In contrast, in order to obtain a pulse laser with a high output and to realize a $CO_2$ laser with a stable beam diameter without depending on the repetition frequency, the $CO_2$ laser device according to Embodiment 1 (FIG. 1) of the present invention includes the laser gas G ($CO_2$ laser medium), the totally reflecting mirror 11 and the partially reflecting mirror 12 (near-concentric stable optical resonator), the acousto-optic element 21 provided in the optical resonator, and the transmission mirrors 51 and 52 (and the transmission mirrors 53 to 56) provided so that the laser light 41 ($CO_2$ laser light) generated from the optical resonator passes again through the $CO_2$ laser medium, and the radius of curvature of the partially reflecting mirror 12 is set to be equal to the distance from the center of the acousto-optic element 21 to the partially reflecting mirror 12.

Thus, by providing a Q-switched $CO_2$ laser oscillation portion (totally reflecting mirror 11, partially reflecting mirror 12, and acousto-optic element 21) and an amplification portion (transmission mirrors 51 to 56), and performing Q-switched oscillation and amplification through the common $CO_2$ laser medium (laser gas G), a $CO_2$ laser device (pulse laser device) having high energy efficiency can be obtained with an inexpensive and simple configuration as illustrated in FIG. 1.

The output of a laser passing through the modulation optical element (acousto-optic element 21) disposed in the optical resonator (totally reflecting mirror 11 and partially reflecting mirror 12) can be suppressed, and hence the thermal lens effect of the acousto-optic element 21 can be suppressed.

Thus, the variation in beam diameter involved in a change in repetition frequency of a pulse laser can be minimized.

Next, description is made of the near-concentric stable optical resonator used as the optical resonator of the Q-switched $CO_2$ laser oscillation portion.

There are two kinds of stable optical resonators. One is a near-parallel flat type in which the diameter of a laser beam is less constricted in an optical resonator, and the other is a near-concentric type in which a remarkable converged point is present in the diameter of a laser beam in an optical resonator.

Figure 2:
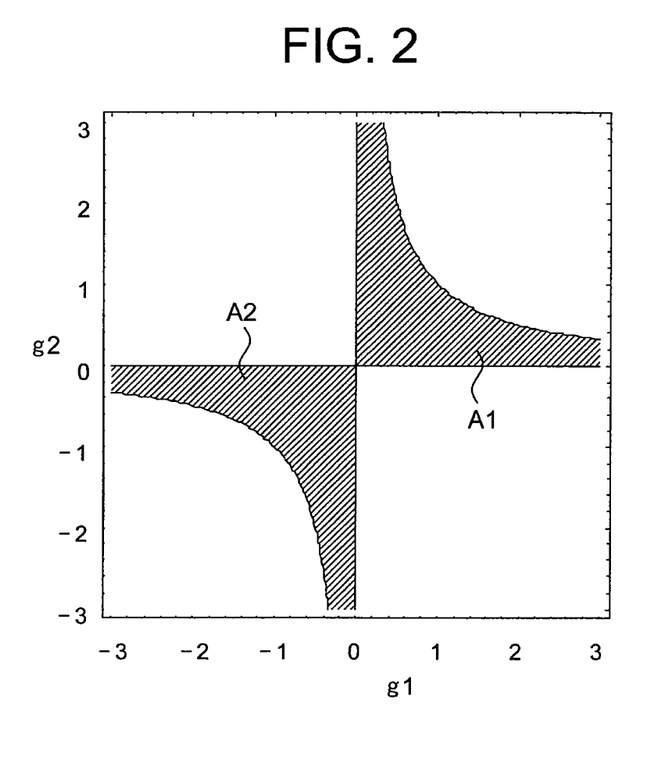
FIG. 2 is an explanatory diagram illustrating two kinds of general optical resonators in regions of g-parameters.

FIG. 2 is an explanatory diagram illustrating two kinds of general optical resonators in regions A1 and A2 of g-parameters (inverse hybrid parameters).

In FIG. 2, g1 and g2 are called g-parameters as is well known by those skilled in the art, and are given by the following Expressions (1) and (2).

$$g1=1-L/R1 \quad (1)$$

$$g2=1-L/R2 \quad (2)$$

Note that, in Expressions (1) and (2), L represents an optical resonator length, and R1 and R2 represent respective radii of curvature of two optical resonator mirrors (totally reflecting mirror 11 and partially reflecting mirror 12 in FIG. 1).

In FIG. 2, gray regions A1 and A2 are g-parameter regions of a stable optical resonator. An optical resonator in the region A1 is called a near-parallel flat type, and an optical resonator in the region A2 is called a near-concentric type.

Figure 3:
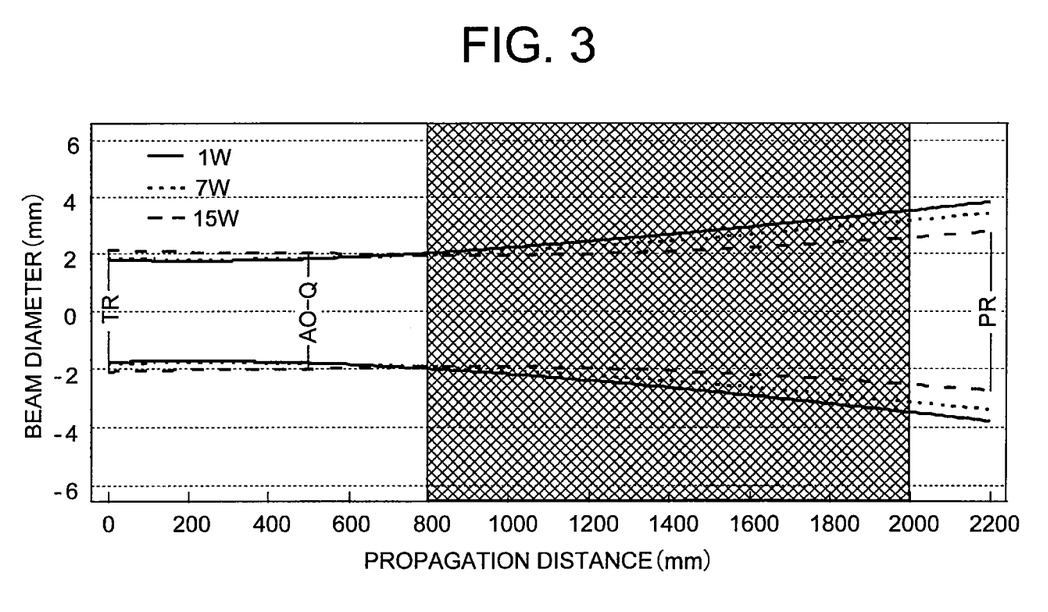
FIG. 3 is an explanatory diagram illustrating a beam diameter in the case of using an optical resonator which is not preferred of the two kinds in FIG. 2.

FIG. 3 is an explanatory diagram illustrating a beam diameter (mm) in an example of the optical resonator of a near-parallel flat type (region A1 of FIG. 2).

In FIG. 3, a horizontal axis represents a propagation distance (mm) corresponding to a coordinate in an optical resonator, and a vertical axis represents a beam diameter. Beam diameter characteristics in the case where the output of the laser light 41 extracted from the laser oscillator is 1 W, 7 W, and 15 W are represented by a solid line, a dotted line, and a broken line, respectively.

Note that, the outputs 1 W, 7 W, and 15 W may be considered as outputs in the case where the repetition frequency is about 3 kHz, 25 kHz, and 50 kHz, respectively.

Further, in FIG. 3, TR and PR represent positions of two resonator mirrors forming the optical resonator, and PR corresponds to a laser output position. Further, AO-Q represents the position of the modulation optical element, and a gray region represents the position in which the $CO_2$ laser medium (laser gas) is present.

As is apparent from FIG. 3, it is understood that, in the case of the optical resonator of a near-parallel flat type (region A1 of FIG. 2), the diameter of a laser beam in the optical resonator is less constricted. Further, it is understood that the beam diameter and spread angle of laser light at the output position PR greatly vary depending on the repetition frequency (output of the laser light 41 extracted from the laser oscillator operated with the repetition frequency).

Further, in the case where the repetition frequency is set to about 100 kHz, and the output of the laser light 41 extracted from the laser oscillator in this case is assumed to be 30 W, there is no stable laser beam capable of propagating through a resonator due to the thermal lens effect of the acousto-optic element 21. Therefore, it is difficult to increase an output substantially to 30 W.

In a general $CO_2$ laser, the overlapping of a laser beam and discharge excitation gas (laser gas) is set to be large for the purpose of extracting energy efficiently from the discharge excitation gas. Therefore, a type of an optical resonator in which the diameter of a laser beam in an optical resonator is less constricted is selected, and an optical resonator of a near-parallel flat type is used.

A general optical resonator of a Q-switched $CO_2$ laser is shown in a known literature (for example, first paragraph in Section 2.2 of J. Xie, et al., "Theoretical calculation and experimental study of acousto-optically Q-switched $CO_2$ laser", Optics Express, vol. 18, No. 12, p. 12371 (2010). Chinese Academy of Science).

In the above-mentioned known literature, an optical resonator length L is 1.2 m, and radii of curvature R1 and R2 of an optical resonator mirror are flat grating (R1=∞) and 2.5 m, respectively.

In this case, g-parameters are as follows: g1=1 and g2=0.52 from Expressions (1) and (2), and hence it is understood that the optical resonator is the one of a near-parallel flat type.

In contrast, the $CO_2$ laser device according to Embodiment 1 (FIG. 1) of the present invention uses the optical resonator of a near-concentric type (region A2 of FIG. 2) and includes the Q-switched $CO_2$ laser oscillation portion (totally reflecting mirror 11 and partially reflecting mirror 12) and the amplification portion (transmission mirrors 51 to 56).

The $CO_2$ laser device performing Q-switched oscillation and amplification with a common $CO_2$ laser medium (laser gas G) as illustrated in FIG. 1 has a configuration in which a large laser output is not necessarily pursued in the Q-switched $CO_2$ laser oscillation portion (totally reflecting mirror 11 and partially reflecting mirror 12), and optical energy is extracted from a laser medium (laser gas G) efficiently in the amplification portion (transmission mirrors 51 to 56).

Figure 4:
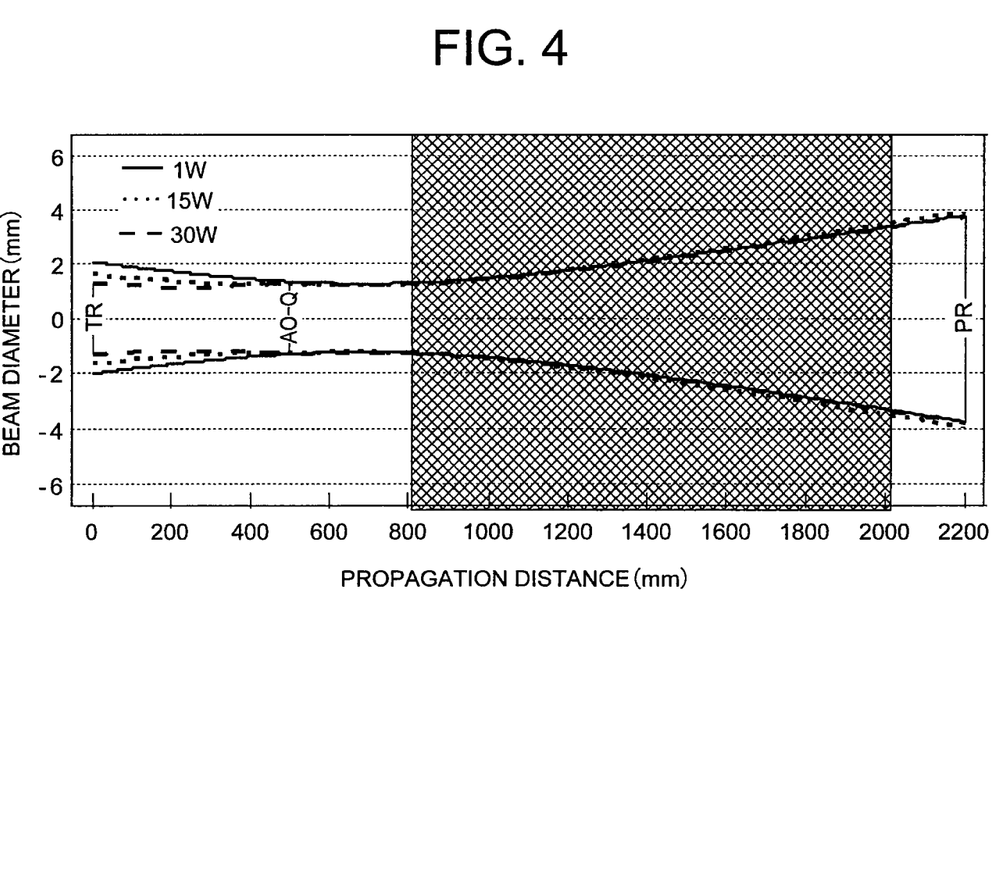
FIG. 4 is an explanatory diagram illustrating a beam diameter in the case of using a preferred optical resonator according to Embodiment 1 of the present invention.

FIG. 4 is an explanatory diagram illustrating a beam diameter in an optical resonator (Q-switched $CO_2$ laser oscillation portion) of a near-concentric type (region A2 of FIG. 2) adopted in Embodiment 1 of the present invention, and like parts as those described above (see FIG. 3) are denoted with like reference symbols.

In FIG. 4, TR represents the position of the totally reflecting mirror 11; PR represents the position (output position) of the partially reflecting mirror 12; AO-Q represents the position of the acousto-optic element 21; and a gray region represents the position in which the laser gas G (discharge excitation gas) is present.

In FIG. 4, three beam diameter characteristics are represented by a solid line, a dotted line, and a broken line, respectively with outputs 1 W, 15 W, and 30 W of the laser light 41 extracted from the laser oscillator being parameters.

Note that, the laser outputs 1 W, 15 W, and 30 W from the Q-switched $CO_2$ laser oscillation portion correspond to the cases where the repetition frequency is about 3 kHz, 50 kHz, and 100 kHz, respectively.

In Embodiment 1 of the present invention, by adopting the optical resonator of a near-concentric type, the beam diameter and spread angle of the laser light 41 output from the partially reflecting mirror 12 can be rendered substantially constant with respect to a change in repetition frequency of a laser as illustrated in FIG. 4.

Thus, the beam diameter of the laser light 42 after amplification becomes substantially constant without depending on the repetition frequency of a pulse laser, and hence the $CO_2$ laser device capable of outputting the laser light 42 having a stable beam diameter without depending on the repetition frequency can be provided.

Further, it is understood from FIG. 4 that the beam diameter in the range which discharge excitation gas (laser gas G) is prevent is also substantially constant without depending on the repetition frequency of a laser.

That is, a region in which the laser beam and the discharge excitation gas overlap each other is substantially constant, and hence there is an effect that stable pulse energy is obtained without depending on the repetition frequency of a pulse laser.

In the optical resonator according to Embodiment 1 (FIGS. 1 and 4) of the present invention, the partially reflecting mirror 12 is disposed on one side and the totally reflecting mirror 11 and the acousto-optic element 21 are arranged on the other side, and the discharge excitation gas (laser gas G) is interposed therebetween.

Further, the acousto-optic element 21 is disposed at the position AO-Q on the totally reflecting mirror 11 side from a position (propagation distance≈700 mm) where a laser beam is thinnest.

On the other hand, in FIG. 3, the beam diameter and the spread angle of laser light change by several ten percent with respect to a change in repetition frequency of a pulse laser, and hence pulse energy is unstable.

Further, the beam diameter in the range in which the discharge excitation gas is present also varies depending on the repetition frequency of a pulse laser, and hence pulse energy which is stable without depending on the repetition frequency of a laser cannot be obtained.

Figure 5:
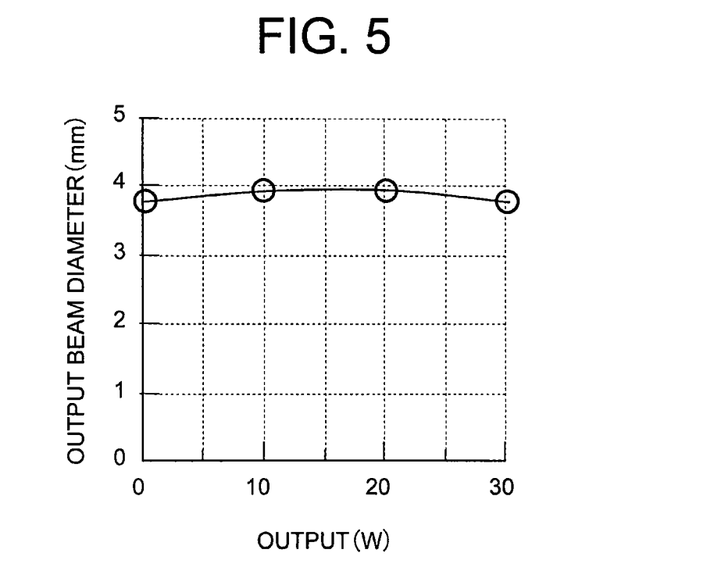
FIG. 5 is an explanatory diagram illustrating beam diameter characteristics in the case of using the preferred optical resonator according to Embodiment 1 of the present invention.

Herein, the advantage is described, which is obtained by setting the radius of curvature of the partially reflecting mirror 12 serving as a resonator mirror to be equal to the distance from the center of the acousto-optic element 21 to the partially reflecting mirror 12 in Embodiment 1 of the present invention, with reference to FIG. 5.

FIG. 5 is an explanatory diagram illustrating beam diameter characteristics in the case of using the optical resonator according to Embodiment 1 of the present invention and illustrates characteristics of an output beam diameter at the output position PR with respect to a laser output, that is, a basic mode beam radius in the partially reflecting mirror 12.

In FIG. 5, a horizontal axis represents an output (W) of the laser light 41 extracted from the laser oscillator, and a vertical axis represents a beam diameter (mm).

When the repetition frequency is adjusted or controlled from several Hz to 100 kHz in the $CO_2$ laser device according to Embodiment 1 of the present invention, the output of the laser light 41 extracted from the laser oscillator varies from the state less than 1 W to 30 W in synchronization with the repetition frequency.

In this case, as is apparent from FIG. 5, it is understood that the output beam diameter becomes maximum in the vicinity of an output of 15 W in an output range (0 to 30 W) coordinated with the operation range of a laser device by using an optical resonator in which the radius of curvature of a resonator mirror is set to be equal to the distance from the acousto-optic element 21 to the resonator mirror.

Thus, when the operation range of a laser device has a point at which the output beam diameter becomes maximum, the variation in beam diameter over the entire operation range can be suppressed.

Further, it is also understood that, in the case where the laser device is operated under the condition of a repetition frequency at which the output of laser light extracted from the laser oscillator is in the vicinity of 15 W (output beam diameter is set to a maximum value), the variation in output beam diameter with respect to a change in properties of a thermal lens of the acousto-optic element 21 is suppressed, and a stable operation can be performed.

Figure 6:
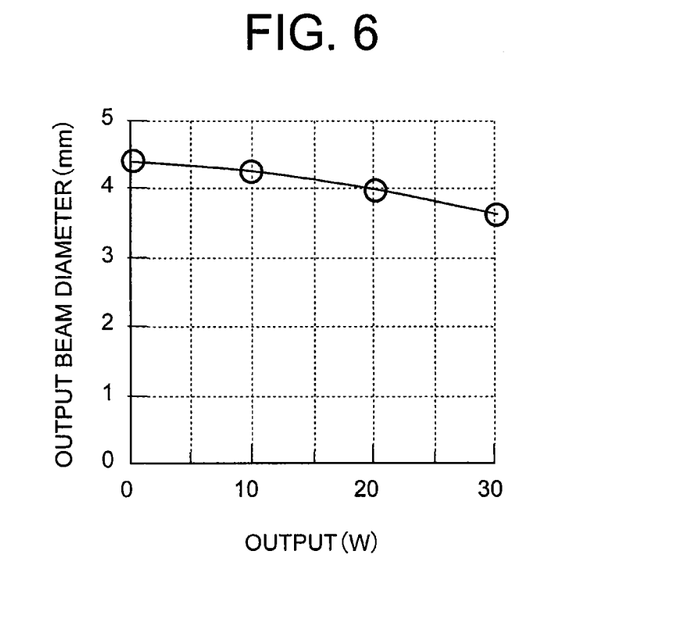
FIG. 6 is an explanatory diagram illustrating beam diameter characteristics in the case of using the optical resonator which is not preferred.

Next, for comparison with the effect of Embodiment 1 described above, the case where the radius of curvature of the resonator mirror is set to be different from the distance from the acousto-optic element 21 to the resonator mirror is considered with reference to FIG. 6.

FIG. 6 is an explanatory diagram illustrating beam diameter characteristics in the case of using an optical resonator which is not preferred, and illustrates characteristics of an output beam diameter (mm) in a configuration in which the radius of curvature of the resonator mirror is set to 1.15 times the distance from the acousto-optic element 21 to the resonator mirror as an example.

As is apparent from FIG. 6, it is understood that, in the case of using the optical resonator in which the radius of curvature of the resonator mirror is set to 1.15 times the distance from the acousto-optic element 21 to the resonator mirror, the output beam diameter at the output position PR decreases monotonously along with an increase in output and there is no point at which the output beam diameter becomes maximum in the output range (0 to 30 W) coordinated with the operation range of the laser device.

That is, unlike the case of FIG. 5, it is difficult to suppress the variation in beam diameter over the entire operation range.

In contrast, according to Embodiment 1 of the present invention, the radius of curvature of the resonator mirror is set to be equal to the distance from the acousto-optic element 21 to the resonator mirror. Therefore, as illustrated in FIG. 5, there is a point at which the output beam diameter becomes maximum in the operation range of the laser device, and the variation in beam diameter can be suppressed over the entire operation range.

Further, in the case of operating the laser device under the condition of the vicinity of the maximum point of FIG. 5, a stable operation can be performed with the variation in output beam diameter with respect to the change in properties of the thermal lens of the acousto-optic element being suppressed.

Accordingly, the beam diameter of the laser light 42 after amplification becomes substantially constant without depending on the repetition frequency of a pulse laser. Therefore, the $CO_2$ laser device capable of outputting the laser light 42 having a stable beam diameter can be provided without depending on the repetition frequency.

Note that, needless to say, the above-mentioned effect can be exhibited even when the relationship between the radius of curvature of the resonator mirror and the distance from the acousto-optic element 21 to the resonator mirror includes an error in a certain allowable range.

Specifically, it is only required that the radius of curvature of the resonator mirror be set to be substantially equal to the distance from the acousto-optic element 21 to the resonator mirror so as to correspond to a range in which the maximum point of the output beam diameter falls in the operation range (0 to 30 W) of the laser device as illustrated in FIG. 5.

As described above, the $CO_2$ laser device according to Embodiment 1 (FIGS. 1, 4, and 5) of the present invention includes the laser gas G ($CO_2$ laser medium), the totally reflecting mirror 11 and the partially reflecting mirror 12 (optical resonator) having the laser gas G interposed therebetween, the acousto-optic element 21 (optical switch) provided in the optical resonator, and the transmission mirrors 51 to 56 for reflecting the laser light 41 output from the optical resonator to outside of the optical resonator.

The optical resonator is formed of a near-concentric stable optical resonator, and the radius of curvature of the partially reflecting mirror 12 is set to be equal to the distance from the center of the acousto-optic element 21 to the partially reflecting mirror 12. The transmission mirrors 51 to 56 (at least the transmission mirrors 51 and 52) are arranged so that the laser light 41 passes through the laser gas G again.

Further, the mirrors for reflecting the laser light 41 are formed of a plurality of transmission mirrors 51 to 56 arranged so as to oppose each other so that different positions of the laser gas G are interposed successively.

Thus, by outputting the laser light 41 at a minimum output level from the optical resonator on a front stage side and outputting the laser light 42 whose output is amplified through the transmission mirrors 51 to 56 on a latter stage side, a pulse laser device capable of outputting the laser light 42 with high energy efficiency and a high output is obtained with an inexpensive and simple configuration.

Further, the variation in beam diameter involved in a change in repetition frequency of a pulse laser can be minimized, and further, stable pulse energy can be obtained without depending on the repetition frequency.

Note that, the acousto-optic element 21 is used as the modulation element (optical switch) in the above description; however, the same effects are exhibited even when other modulation elements such as an electrooptical element are used.

This is because, as the modulation element in the present invention, an element having a side effect in which heat generated by the incidence of a laser beam influences the laser beam propagation, as well as the modulation function of laser light, can be applied.

Further, needless to say, the number of the transmission mirrors 51 to 56 for guiding the laser light 41 to the same laser gas G is not limited and can be changed arbitrarily as needed while the same effects are exhibited.

Embodiment 2

In Embodiment 1 (FIG. 1), the totally reflecting mirror 11 and the partially reflecting mirror 12 are arranged so as to oppose each other through intermediation of the laser gas G, and further the Brewster plate 13 for providing linear polarization to laser light is interposed between the totally reflecting mirror 11 and the partially reflecting mirror 12. However, as illustrated in FIG. 7, the totally reflecting mirror 11 and the acousto-optic element 21 may be arranged in parallel to the partially reflecting mirror 12 on one side of the laser gas G, and mirrors 14 and 15 for turning back light may be disposed on the opposite side through intermediation of the laser gas G.

Figure 7:
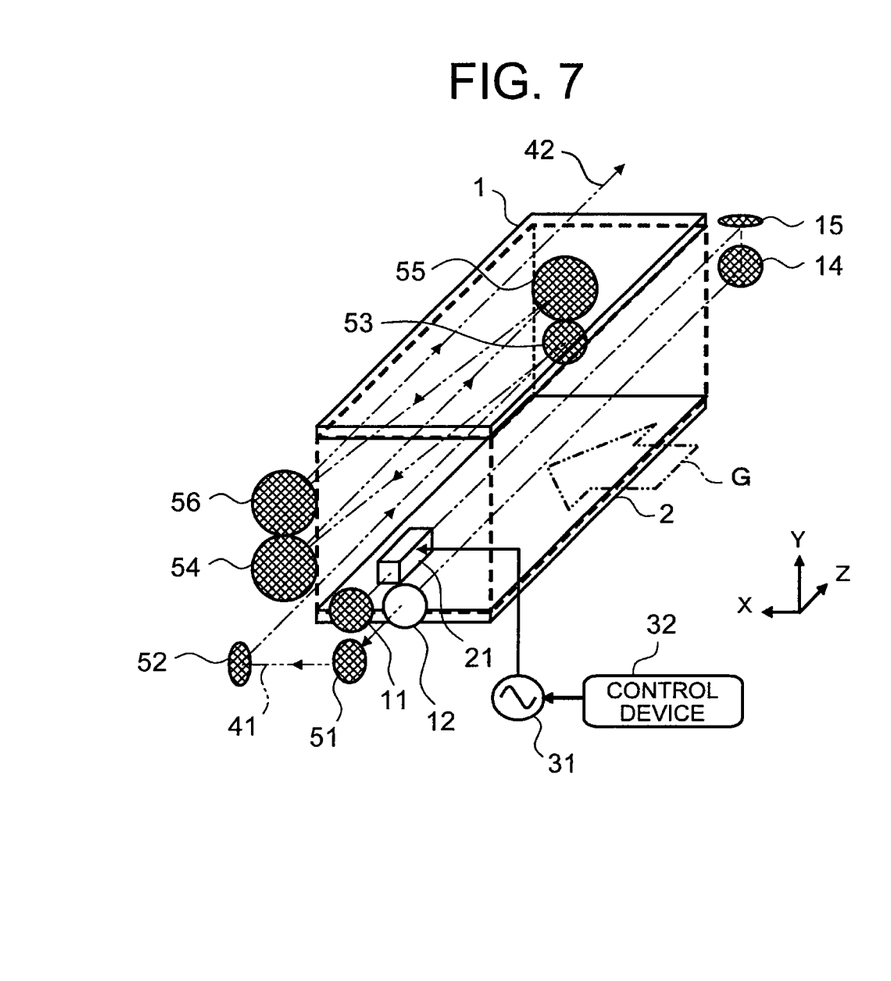
FIG. 7 is a perspective view illustrating, in a transparent manner, a configuration of a $CO_2$ laser device according to Embodiment 2 of the present invention.

FIG. 7 is a perspective view illustrating, in a transparent manner, a $CO_2$ laser processing device according to Embodiment 2 of the present invention. Like components as those described above (see FIG. 1) are denoted with like reference symbols, and the detailed description thereof is omitted.

The $CO_2$ laser processing device illustrated in FIG. 7 includes the mirrors 14 and 15 in place of the Brewster plate 13 in the foregoing description (FIG. 1).

This configuration is substantially the same as the above-mentioned configuration (FIG. 1) but is different therefrom in that the optical resonator including an optical path from the totally reflecting mirror 11 to the partially reflecting mirror 12 includes a light turn-back configuration (mirrors 14 and 15). In the following, only the difference from the above-mentioned configuration is focused.

In FIG. 7, the optical resonator includes the mirrors 14 and 15 for turning back light in the resonator in addition to the totally reflecting mirror 11 and the partially reflecting mirror 12 serving as resonator mirrors and the acousto-optic element 21.

In particular, the mirror 14 opposed to the partially reflecting mirror 12 is a metallic mirror coated so as to have a reflectance of 98.5% with respect to S-polarized light and a reflectance of 1.5% with respect to P-polarized light.

Thus, the mirror 14 serves not only to turn back light in the resonator but also to provide linear polarization in the X-direction to laser light.

Note that, also in Embodiment 2 of the present invention illustrated in FIG. 7, a near-concentric stable optical resonator is used as the optical resonator in the Q-switched $CO_2$ laser oscillation portion.

Further, the radius of curvature of the partially reflecting mirror 12 and the optical distance from the acousto-optic element 21 to the partially reflecting mirror 12 via the mirrors 14 and 15 are set to be equal to each other.

Further, the Q-switched pulse $CO_2$ laser light 41 generated from the optical resonator is amplified by using the transmission mirrors 52 to 56 and causing the Q-switched pulse $CO_2$ laser light 41 to pass through a laser medium as in Embodiment 1.

By configuring the $CO_2$ laser device as illustrated in FIG. 7, a $CO_2$ laser device (pulse laser device) having high energy efficiency can be obtained with an inexpensive and simple configuration in the same way as in Embodiment 1.

Further, the thermal lens effect of the acousto-optic element 21 can be suppressed, and a $CO_2$ laser device capable of outputting the laser light 42 having a stable beam diameter can be provided without depending on the repetition frequency.

Note that, although flat mirrors are used as the mirrors 14 and 15, mirrors having a curvature may be used.

Thus, in general optical resonators in which mirrors having a curvature are present as well as the totally reflecting mirror 11 and the partially reflecting mirror 12 at an end of the optical resonator, g-parameters are given as follows: g1=A and g2=D, when a ray matrix in one path of an optical resonator is expressed by the following Expression (3), as is well known by those skilled in the art.

$$\begin{pmatrix} A & B \\ C & D \end{pmatrix} \tag{3}$$

In the definition of Expression (3), the region A2 of FIG. 2 is called a near-concentric type.

Embodiment 3

Figure 8:
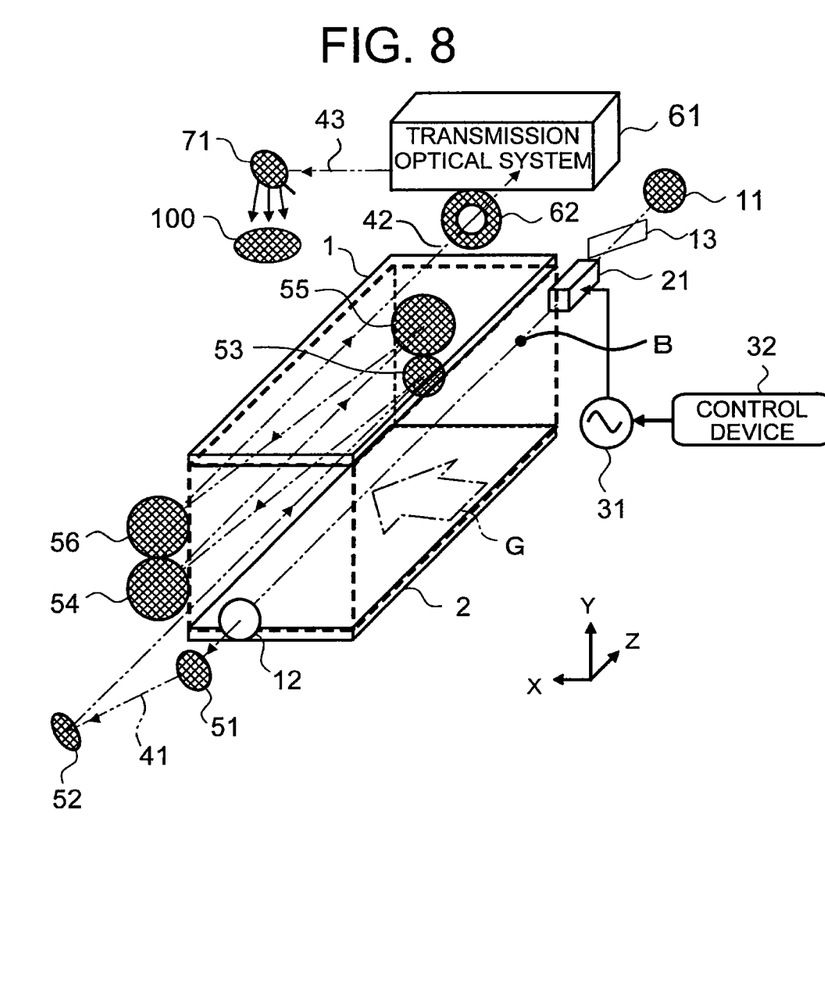
FIG. 8 is a perspective view illustrating, in a transparent manner, a $CO_2$ laser processing device according to Embodiment 2 of the present invention.

Note that, although the $CO_2$ laser device for outputting the stable laser light 42 with a high output is described in Embodiments 1 and 2 (FIGS. 1 to 7), a $CO_2$ laser processing device specifically using the laser light 42 may be configured as illustrated in FIG. 8.

FIG. 8 is a perspective view illustrating, in a transparent manner, a $CO_2$ laser processing device according to Embodiment 3 of the present invention. Like components as those described above (see FIG. 1) are denoted with like reference symbols, and the detailed description thereof is omitted.

In FIG. 8, the $CO_2$ laser processing device includes, in addition to the $CO_2$ laser device described above (FIG. 1), a transmission optical system 61 formed of optical elements (mirror, lens, etc.), an aperture 62 for allowing the laser light 42 to pass therethrough to enter the transmission optical system 61, a galvanomirror 71 for scanning a laser beam 43 transmitted through the transmission optical system 61 at a high speed to irradiate a workpiece 100 with the laser beam 43, and a stage (not shown) on which the workpiece is to be mounted.

The stable laser light 42 with a high output, which is output from the $CO_2$ laser device, passes through the aperture 62 and the transmission optical system 61 to become the laser beam 43 after transmission, and is reflected and scanned at a high speed by the galvanomirror 71 to irradiate the workpiece 100.

The aperture 62 shapes a lateral mode of the laser light 42 as intended by a designer to allow the laser light 42 to enter the transmission optical system 61.

The transmission optical system 61 serves to change the course of the laser beam 43 so that the incident laser beam is directed to the workpiece 100 and to control a beam diameter and divide a beam so that the laser beam 43 becomes suitable for processing.

Note that, the aperture 62 may be incorporated in the transmission optical system 61.

The galvanomirror 71 positions the irradiation position of the laser beam 43 on the workpiece 100 at a place to be processed and controls the laser beam 43 so that the laser beam 43 draws a track in accordance with a processing purpose by scanning the laser beam 43 at a high speed.

Further, in FIG. 8, a point B positioned in an optical path in the optical resonator formed of the totally reflecting mirror 11, the partially reflecting mirror 12, and the like is preferred to be placed at a position (corresponding to a propagation distance of 700 mm in FIG. 4) where the variation in beam diameter by the repetition frequency becomes smallest in the optical resonator.

The aperture 62 is disposed to a point obtained by optically transcribing the point B, that is, a conjugate point of the point B.

As the configuration for positioning the aperture 62 at the transcribed point of the point B, the following is considered: providing a curvature also on a surface of a non-reflection side of the partially reflecting mirror 12; providing a curved surface on any of the transmission mirrors 51 to 56; inserting a lens (not shown) in the optical path of the laser light 41; or combining these configurations arbitrarily.

As described above, the $CO_2$ laser processing device according to Embodiment 3 (FIG. 8) of the present invention uses the above-mentioned $CO_2$ laser device (FIGS. 1, 4, and 5), and includes the aperture 62 for shaping the laser light 42 output from the $CO_2$ laser device by allowing the laser light 42 to pass therethrough and the transmission optical system 61 for guiding the laser light 42 into the workpiece 100 as the laser beam 43.

Further, the aperture 62 is disposed to a conjugate point of the point B where the variation in beam diameter by the repetition frequency of the laser light 41 (pulse laser) becomes smallest in the optical resonator (totally reflecting mirror 11 and partially reflecting mirror 12) in the $CO_2$ laser device.

At the point B, the beam diameter in the optical resonator is substantially constant without depending on the repetition frequency of a pulse laser (see FIG. 4). Therefore, the beam diameter on the aperture 62 which is present at the conjugate point of the point B in the optical resonator is also substantially constant without depending on the repetition frequency of the laser light 42 (pulse laser), and the laser light 42 cut out by the aperture 62 has a predetermined lateral mode.

Thus, the $CO_2$ laser processing device according to Embodiment 3 of the present invention can perform uniform processing without depending on the repetition frequency in addition to the effect of realizing stable pulse energy by the above-mentioned $CO_2$ laser device (FIG. 1), thereby realizing a $CO_2$ laser processing device with high processing productivity.

Further, the $CO_2$ laser processing device of Embodiment 3 uses a $CO_2$ laser device with a high output similar to the above-mentioned $CO_2$ laser device, and hence there is an effect of obtaining a $CO_2$ laser processing device having high energy efficiency and processing productivity with an inexpensive and simple configuration.

Note that, the case of applying the $CO_2$ laser device of FIG. 1 (Embodiment 1) is described in FIG. 8, but needless to say, the same effects are also exhibited even when the $CO_2$ laser processing device similar to that of FIG. 8 is configured by applying the $CO_2$ laser device of FIG. 7 (Embodiment 2).

Further, in the same way as in the above description, the same effects are also exhibited even when any modulation element such as an electrooptical element is used as the modulation element (optical switch) in place of the acousto-optic element 21. This is because, as the modulation element, an element having a side effect in which heat generated by the incidence of a laser beam influences the laser beam propagation, as well as the modulation function of laser light, can be applied.

Further, the number of the transmission mirrors 51 to 56 for guiding the laser light 41 to the same laser gas G can be set arbitrarily.

REFERENCE SIGNS LIST 1, 2 electrode, 11 totally reflecting mirror, 12 partially reflecting mirror, 13 Brewster plate (polarization selecting element), 14,15 mirror, 21 acousto-optic element (modulation element), 31 power source, 32 control device, 41,42 laser light, 43 laser beam, 51 to 56 mirror, 61 transmission optical system, 62 aperture, 71 galvanomirror, 100 workpiece, B point in optical resonator, G laser gas, PR output position.

The invention claimed is:

1. A $CO_2$ laser device, comprising:
a $CO_2$ laser medium formed in a cuboid form discharge space and moved circularly in the discharge space by forced convection;
an optical resonator, in which the $CO_2$ laser medium is interposed;
an optical switch provided in the optical resonator; and
a transmission mirror for reflecting laser light output from the optical resonator to outside of the optical resonator,
wherein the optical resonator comprises a near-concentric stable optical resonator,
wherein the optical resonator comprises a first resonator mirror and a second resonator mirror, and the optical resonator is for extracting the laser light from the $CO_2$ laser medium,
wherein a radius of curvature of the first resonator mirror is set so as to be equal to a distance from the optical switch to the first resonator mirror,
wherein, in the optical resonator, the $CO_2$ laser medium is disposed only between the optical switch and the first resonator mirror,
wherein the optical switch is disposed on an optical axis between the first resonator mirror and the second resonator mirror so as to be disposed at a position on the second resonator mirror side at a position where the beam diameter of the laser light which passes between the first resonator mirror and the second resonator mirror is thinnest, and
wherein the transmission mirror receives said laser light transmitted through the first resonator mirror and reflects the received laser light so that the laser light passes through the $CO_2$ laser medium again.

2. A $CO_2$ laser device according to claim 1, wherein the first resonator mirror comprises a partially reflecting mirror, and the laser light extracted from the first resonator mirror passes through the $CO_2$ laser medium again.

3. A $CO_2$ laser device according to claim 1, wherein the transmission mirror comprises a plurality of transmission mirrors arranged so as to oppose each other so that different positions of the $CO_2$ laser medium are interposed successively.

4. A $CO_2$ laser device according to claim 1, wherein the optical switch comprises an acousto-optic element.

5. A $CO_2$ laser device according to claim 1, wherein the optical switch comprises an electrooptical element.

6. A $CO_2$ laser device according to claim 1, further comprising a Brewster plate or a mirror, which provides linear polarization in the optical resonator.

7. A $CO_2$ laser processing device, comprising the $CO_2$ laser device according to claim 1.

8. A $CO_2$ laser processing device according to claim 7, further comprising:
   an aperture for shaping laser light output from the $CO_2$ laser device by allowing the laser light to pass therethrough; and
   a transmission optical system for guiding the laser light to a workpiece as a laser beam,
   wherein the aperture is disposed at a conjugate point with respect to a point where a variation in beam diameter by a repetition frequency of the laser light becomes smallest in an optical resonator in the $CO_2$ laser device.

* * * * *